US012608769B1

(12) United States Patent
Saracchini et al.

(10) Patent No.: US 12,608,769 B1
(45) Date of Patent: Apr. 21, 2026

(54) THREE-DIMENSIONAL (3D) RECONSTRUCTION ACROSS VARIOUS IMAGE CAPTURE MODALITIES

(71) Applicant: Apple Inc., Cupertino, CA (US)

(72) Inventors: Rafael Felipe Veiga Saracchini, Berlin (DE); Aaron Wetzler, Rishon Letzion (IL)

(73) Assignee: APPLE INC., Cupertino, CA (US)

( * ) Notice: Subject to any disclaimer, the term of this patent is extended or adjusted under 35 U.S.C. 154(b) by 376 days.

(21) Appl. No.: 18/534,102

(22) Filed: Dec. 8, 2023

Related U.S. Application Data

(60) Provisional application No. 63/434,678, filed on Dec. 22, 2022.

(51) Int. Cl.
| | |
|---|---|
| *G06T 5/50* | (2006.01) |
| *G06T 3/047* | (2024.01) |
| *G06T 3/18* | (2024.01) |
| *G06T 5/80* | (2024.01) |
| *G06T 7/11* | (2017.01) |
| *G06T 7/174* | (2017.01) |
| *G06T 7/80* | (2017.01) |
| *G06T 11/00* | (2026.01) |

(52) U.S. Cl.
CPC .............. *G06T 5/50* (2013.01); *G06T 3/047* (2024.01); *G06T 3/18* (2024.01); *G06T 5/80* (2024.01); *G06T 7/11* (2017.01); *G06T 7/174* (2017.01); *G06T 7/85* (2017.01); *G06T 11/00* (2013.01); *G06T 2207/10012* (2013.01); *G06T 2210/21* (2013.01); *G06T 2210/22* (2013.01)

(58) Field of Classification Search
CPC .. G06T 5/50; G06T 3/047; G06T 3/18; G06T 5/80; G06T 7/11; G06T 7/174; G06T 7/85; G06T 11/00; G06T 2207/10012; G06T 2210/21; G06T 2210/22
See application file for complete search history.

(56) References Cited

U.S. PATENT DOCUMENTS

| | | | | |
|---|---|---|---|---|
| 8,116,586 | B2 * | 2/2012 | Souchard | G06T 5/80 |
| | | | | 348/241 |
| 11,243,656 | B2 * | 2/2022 | Li | G06F 3/04815 |
| 2014/0044325 | A1 * | 2/2014 | Ma | G06T 7/33 |
| | | | | 382/128 |

(Continued)

*Primary Examiner* — Delomia L Gilliard
(74) *Attorney, Agent, or Firm* — Fernando & Partners, LLP

(57) ABSTRACT

In accordance with some implementations, a method is performed at an electronic device with a non-transitory memory and one or more processors. The method includes determining first transformed image coordinates by transforming first image coordinates of a first image into curvilinear space. The first image is associated with a first field-of-view (FOV) of a physical environment. The method includes obtaining second image coordinates of a second image associated with a second FOV of the physical environment. The second FOV is different from and partially overlaps with the first FOV. The method includes determining an image modification parameter based on the first transformed image coordinates and the second image coordinates. The method includes generating first and second modified images based on the first image, the second image, and the image modification parameter.

20 Claims, 14 Drawing Sheets
(7 of 14 Drawing Sheet(s) Filed in Color)

(56) References Cited

U.S. PATENT DOCUMENTS

| | | | | | |
|---|---|---|---|---|---|
| 2014/0368606 | A1* | 12/2014 | Bassi | .................. | H04N 13/305 |
| | | | | | 348/36 |
| 2016/0088280 | A1* | 3/2016 | Sadi | ..................... | G02B 27/017 |
| | | | | | 348/48 |
| 2017/0302714 | A1* | 10/2017 | Ramsay | ................. | G06F 40/134 |
| 2018/0205936 | A1* | 7/2018 | Jin | ....................... | H04N 13/189 |
| 2019/0012804 | A1* | 1/2019 | Wang | ...................... | G06T 7/593 |
| 2019/0243388 | A1* | 8/2019 | Zhang | ................... | G05D 1/102 |
| 2020/0020075 | A1* | 1/2020 | Khwaja | ..................... | G06T 5/70 |
| 2020/0117918 | A1* | 4/2020 | Wallin | .................... | B60R 11/04 |
| 2020/0342652 | A1* | 10/2020 | Rowell | ................. | G06V 10/82 |
| 2021/0195840 | A1* | 7/2021 | Puryk | ................... | A01D 90/10 |
| 2022/0076037 | A1* | 3/2022 | Hochman | ............. | G05D 1/249 |
| 2023/0081476 | A1* | 3/2023 | Rauniyar | .................. | G06T 7/73 |
| | | | | | 348/45 |
| 2024/0428458 | A1* | 12/2024 | Danziger | ............... | G06T 7/246 |
| 2025/0060244 | A1* | 2/2025 | Sheinin | ................... | G06T 7/262 |
| 2025/0173840 | A1* | 5/2025 | Iseki | ......................... | G06T 5/50 |
| 2026/0019712 | A1* | 1/2026 | Niazi | ................... | H04N 23/698 |

* cited by examiner

220

232

230

250

240

500

THREE-DIMENSIONAL (3D) RECONSTRUCTION ACROSS VARIOUS IMAGE CAPTURE MODALITIES

CROSS-REFERENCE TO RELATED APPLICATIONS

This application claims the benefit of U.S. Provisional Patent App. No. 63/434,678, filed on Dec. 22, 2022, which is incorporated by reference in its entirety.

TECHNICAL FIELD

The present disclosure relates to image processing, and, in particular, image warping.

BACKGROUND

Three-dimensional (3D) reconstruction involves generating respective graphical representations of one or more physical objects of a physical environment. Certain 3D reconstruction techniques include capturing images of a physical environment, and rectifying the images with each other in order to simplify computations associated with generating the 3D reconstruction. For example, a first image may be associated with a first field-of-view (FOV), whereas a second image may be associated with a second FOV different from the first FOV.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the present disclosure can be understood by those of ordinary skill in the art, a more detailed description may be had by reference to aspects of some illustrative implementations, some of which are shown in the accompanying drawings.

Figure 1A:
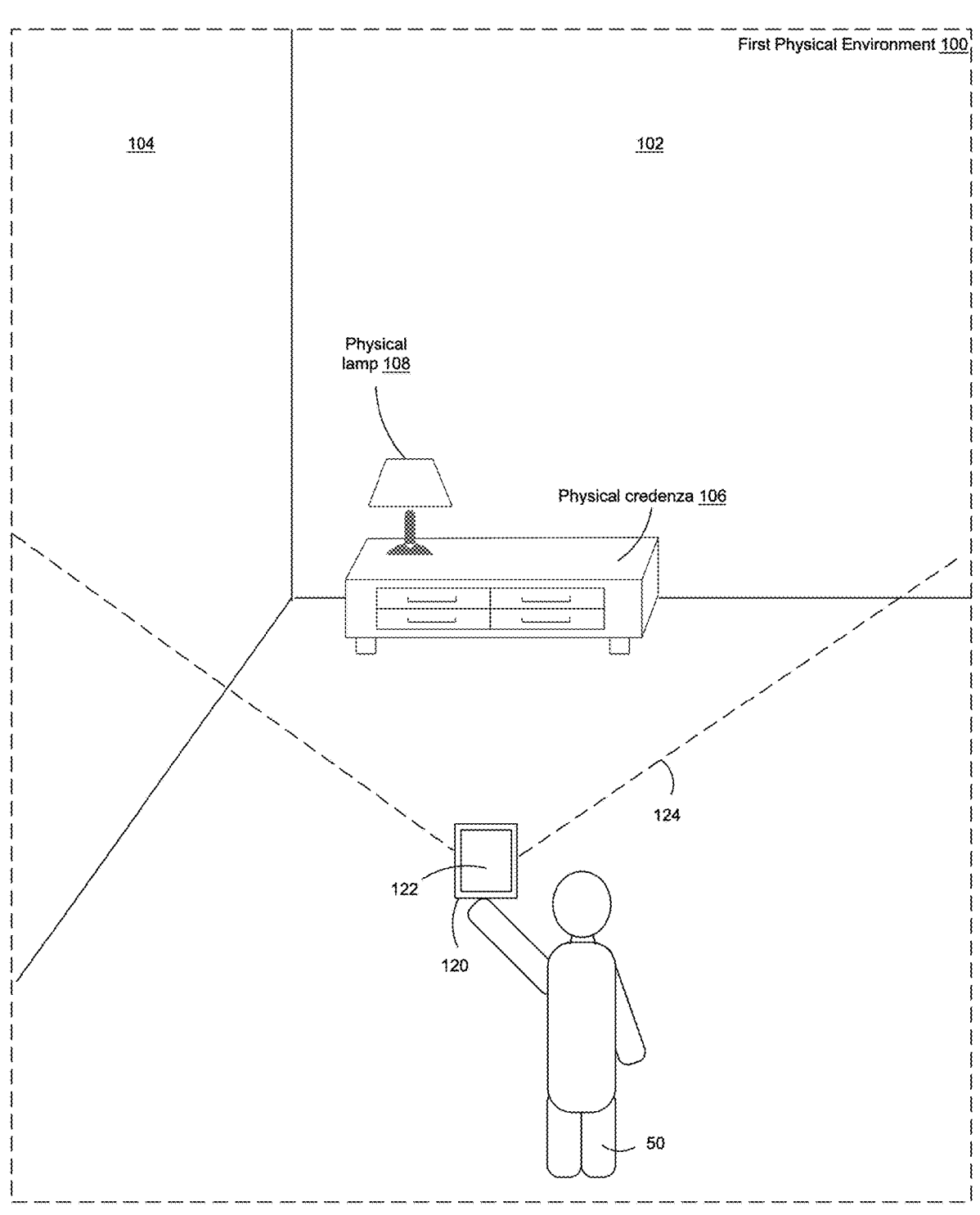
FIG. 1A is an example of a first physical environment to be 3D reconstructed by an electronic device in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

In accordance with some implementations, a method is performed at an electronic device with a non-transitory memory and one or more processors. The method includes determining first transformed image coordinates by transforming first image coordinates of a first image into curvilinear space. The first image is associated with a first FOV of a physical environment. The method includes obtaining second image coordinates of a second image associated with a second FOV of the physical environment. The second FOV is different from and partially overlaps with the first FOV. The method includes determining an image modification parameter based on the first transformed image coordinates and the second image coordinates. The method includes generating first and second modified images based on the first image, the second image, and the image modification parameter.

In accordance with some implementations, an electronic device includes one or more processors and a non-transitory memory. One or more programs are stored in the non-transitory memory and are configured to be executed by the one or more processors. The one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

DESCRIPTION 3D reconstruction involves generating respective geometric representations of one or more physical objects of a physical environment. Certain 3D reconstruction techniques include capturing first and second images of a physical environment, and rectifying the images with respect to each other in order to generate the 3D reconstruction. For example, the first image may be associated with a first FOV, whereas the second image may be associated with a second FOV different from the first FOV. The quality of the 3D reconstruction, however, may be degraded due to a short baseline that causes FOV overlap to be relatively large and the difference between the images to be relatively small resulting in disparity information that is relatively small and overly sensitive to noise and being unsuitable for 3D stereo. Conversely, a large baseline causes the FOV overlap to be relatively small or even non-intersecting and with no common regions a 3D reconstruction is unfeasible. It is desirable to have an intersecting FOV with a baseline that is greater than a lower bound threshold to allow the disparity to be measured and less than an upper bound threshold to prevent nonintersecting FOVs. As another example, when performing an epipolar-based image rectification of the first and second images, the rectified first and second images may have a relatively low amount of disparity with respect to each other. The relatively low amount of disparity may reduce the accuracy of depth calculations made during the 3D reconstruction, resulting in a low quality 3D reconstruction.

Inadequate disparity range may result from various image capture modalities. For example, for a device including multiple image sensors (e.g., a smartphone with two cameras), a first image sensor may be disposed too close to a second image sensor on the device, or the first image sensor may be physically misaligned relative to the second image sensor on the device.

By contrast, various implementations disclosed herein include methods, electronic devices, and systems for determining one or more image coordinate transforms for transforming respective image coordinates into curvilinear space. The transformation into the curvilinear space enables an electronic device to account for a limited amount of FOV overlap between camera captured images. For example, the electronic device may warp an image via an image warping model, which may be selected based on respective borders of captured images. Warping provides a larger FOV (e.g., in vertical and horizontal directions), as compared with rectilinear space made of other rectification techniques. For example, first and second images are captured via one or more pinhole cameras in rectilinear space, and the electronic device transform respective image coordinates of at least one the first and second images from the rectilinear space to the curvilinear space. In some implementations, a single image sensor captures the first and second images. For example, an image sensor captures the first image while the image sensor has the first FOV, and, after forwards or backwards motion of the image sensor, the image sensor captures the second image while the image sensor has the second FOV.

Moreover, the electronic device generates modified images based on the first image, the second image, and an image modification parameter. For example, the image modification parameter indicates a FOV intersection region that is based on transformed image coordinates. Continuing with this example, the electronic device may crop out respective regions of rectified first and second images based on the FOV intersection region. As another example, the image modification parameter indicates a configuration parameter associated with 3D reconstruction.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

FIG. 1A is an example of a first physical environment 100 to be 3D reconstructed by an electronic device 120 in accordance with some implementations. A user 50 holds the electronic device, and positions the electronic device 120 towards the first physical environment 100. In some implementations, the electronic device 120 corresponds to a mobile device (e.g., a smartphone, a tablet, etc.) or a head-mountable device (HMD).

The first physical environment 100 includes a first physical wall 102, a second physical wall 104, a physical credenza 106, and a physical lamp 108 resting on the surface of the physical credenza 106.

In some implementations, the electronic device 120 includes a display 122 that is associated with a viewable region 124 of the first physical environment 100. In implementations, the electronic device 120 includes one or more image sensors that captures image data of the first physical environment 100, and the electronic device 120 displays, on the display 122, the image data (e.g., as pass-through image data). In some implementations, while displaying the image data, the electronic device 120 displays, on the display 122, computer-generated content in order to generate an extended reality (XR) environment, such as an augmented reality (AR) environment or a mixed reality (MR) environment.

Figure 1B:
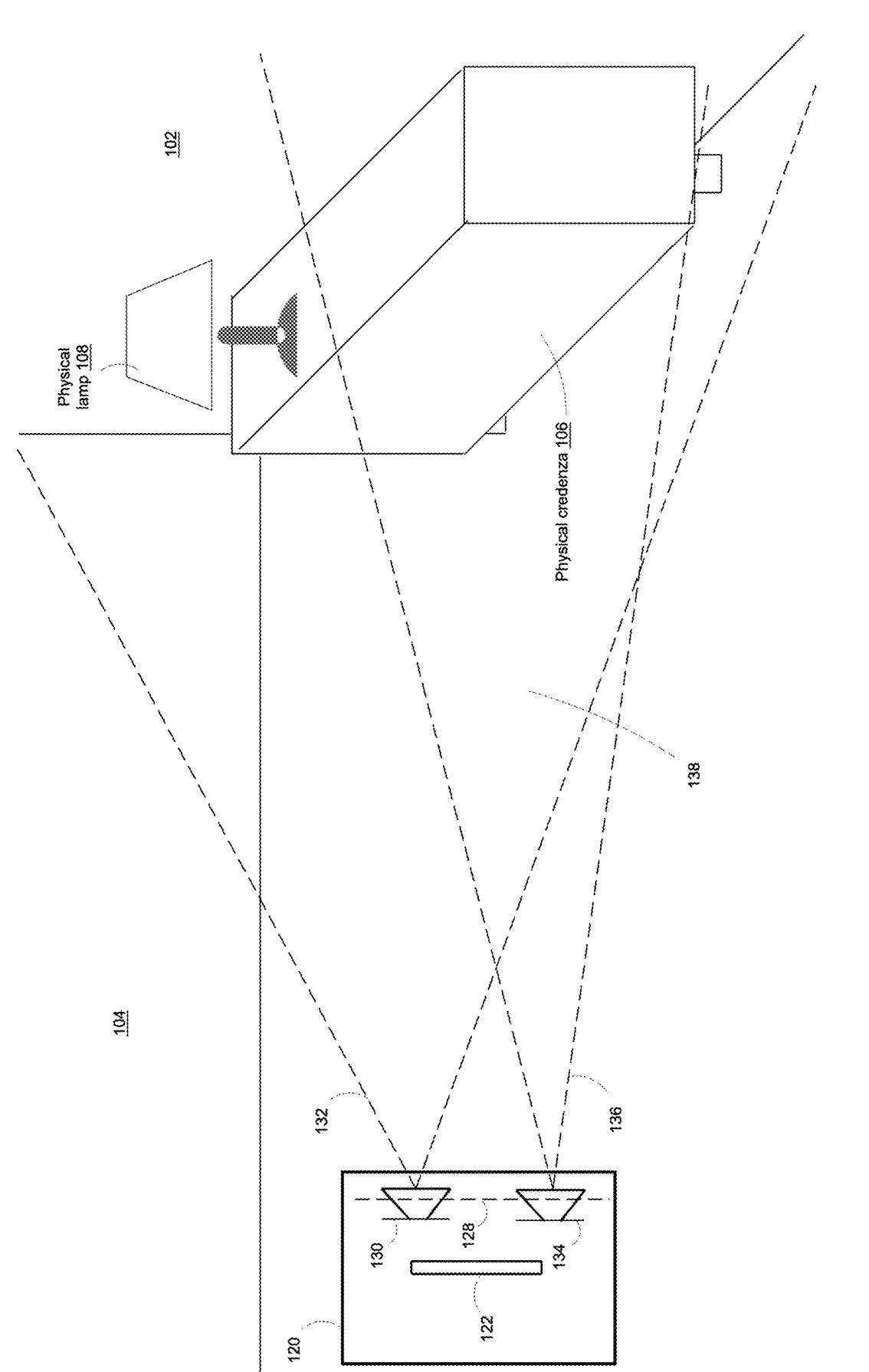
FIGS. 1B-1E are examples of various image capture modalities in accordance with some implementations.

As illustrated in FIG. 1B, in some implementations, the electronic device 120 includes a first image sensor 130 and a second image sensor 134, each of which is configured to capture image data of the first physical environment 100. The first image sensor 130 and the second image sensor 134 are substantially aligned with respect to each other on a surface of the electronic device 120. Namely, as illustrated in FIG. 1B, the first image sensor 130 and the second image sensor 134 are vertically aligned (e.g., above and below) with respect to each other on the surface of the electronic device 120. In other implementations, the first image sensor 130 and the second image sensor 134 are horizontally aligned (e.g., side-by-side) with respect to each other on the surface of the electronic device 120. In other implementations, the first image sensor 130 and the second image sensor 134 are diagonally aligned with respect to each other on the surface of the electronic device 120

Because the first image sensor 130 is substantially aligned with the second image sensor 134, a first angular orientation of the first image sensor 130 is substantially similar to a second angular orientation of the second image sensor 134. For example, each of the first image sensor 130 and the second image sensor 134 are pointing at approximately the same location within the first physical environment 100. The similarity of the respective angular orientations is indicated by the first image sensor 130 and the second image sensor 134 having similar orientations relative to a reference line 128, which is illustrated for purely explanatory purposes.

The first image sensor 130 is associated with a first FOV 132, and the second image sensor 134 is associated with a second FOV 136. The first image sensor 130 includes a wide lens, whereas the second image sensor 134 includes a standard lens (e.g., non-wide lens). Accordingly, the first FOV 132 is larger (e.g., wider) than the second FOV 136. Due to the similarity in the respective angular orientations, the first FOV 132 partially overlaps with the second FOV 136 in a first overlapping region 138 of the first physical environment 100. Nonetheless, due to the proximity of the first image sensor 130 to the second image sensor 134 on the surface of the electronic device 120, the amount of the partial overlap (e.g., the size of the first overlapping region 138) is less than a threshold amount. The relatively small amount of partial overlap may degrade the quality of a 3D reconstruction of the first physical environment 100. Accordingly, various implementations disclosed herein include transforming image coordinates into curvilinear space, in order to account for the relatively small amount of the partial overlap.

Figure 1C:
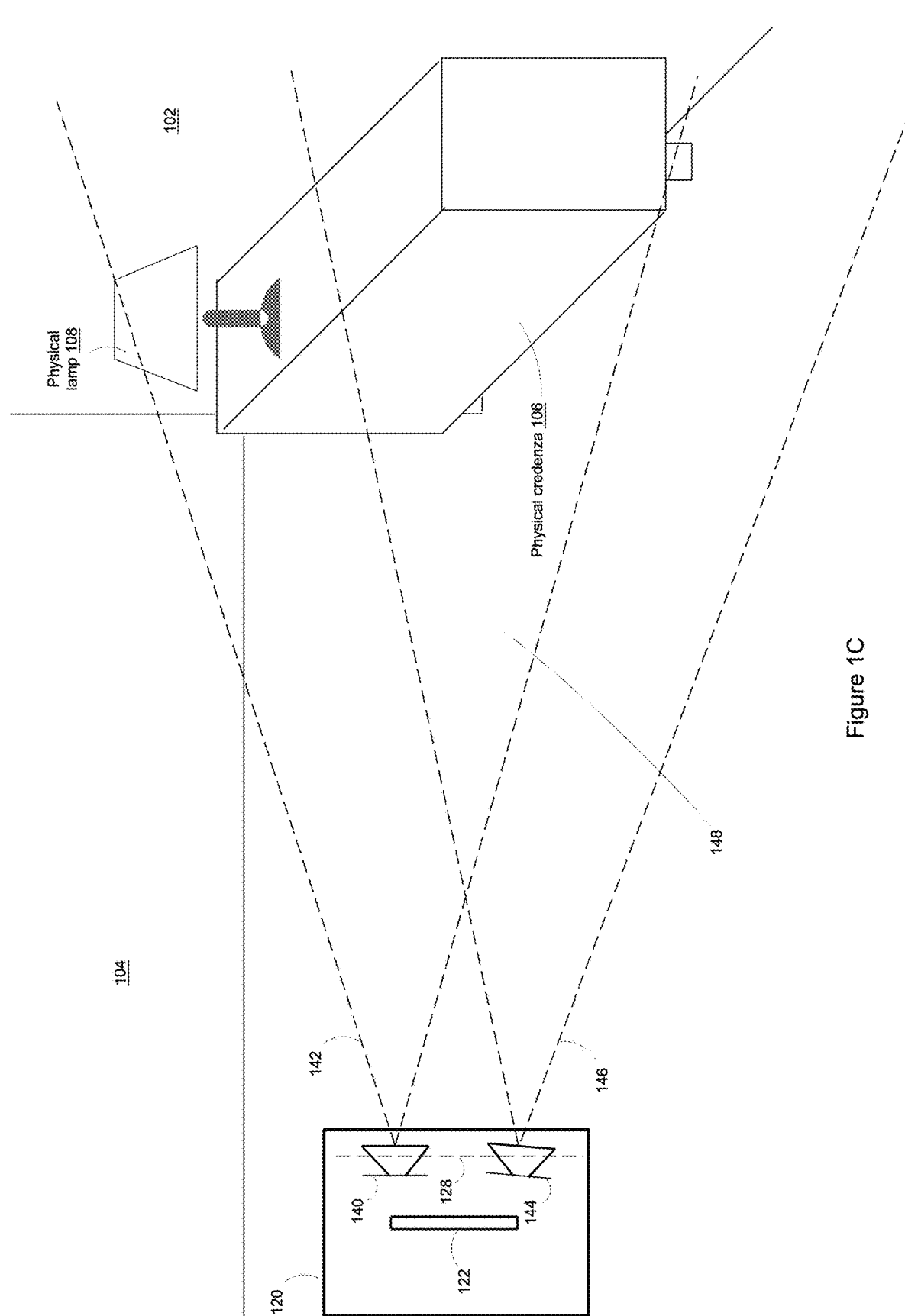

As illustrated in FIG. 1C, in some implementations, the electronic device 120 includes a third image sensor 140 and a fourth image sensor 144, each of which is configured to capture image data of the first physical environment 100. In contrast to the example described with reference to FIG. 1B, the third image sensor 140 is not substantially aligned with respect to the fourth image sensor 144. Namely, whereas the third image sensor 140 is substantially parallel relative to the reference line 128, the fourth image sensor 144 is pointing slightly downwards relative to the reference line 128, as illustrated in FIG. 1C. Misalignment between image sensors can be caused by various reasons, such as a design defect, a manufacturing defect, contact of the electronic device 120 against a physical surface (e.g., a user dropping a smartphone on the ground), and/or the like. Accordingly, a third angular orientation of the third image sensor 140 within the electronic device 120 is not substantially similar to a fourth angular orientation of the fourth image sensor 144 within the electronic device 120.

The third image sensor 140 is associated with a third FOV 142, and the fourth image sensor 144 is associated with a fourth FOV 146. Each of the third image sensor 140 and the fourth image sensor 144 includes a standard lens, and thus the third FOV 142 is substantially similar in size to the fourth FOV 146. However, one of ordinary skill in the art will appreciate that other implementations include misaligned image sensors having different respective lens types, including a wide lens or a fisheye lens. Notably, because the fourth image sensor 144 is pointing slightly downwards, the fourth FOV 146 is correspondingly pointing slightly downwards relative to the third FOV 142. In other words, despite the fact that the third image sensor 140 and the fourth image sensor 144 include respective lenses of the same standard lens type, the third FOV 142 is not parallel to the fourth FOV 146. Nonetheless, due to the proximity of the third image sensor 140 to the fourth image sensor 144 on the surface of the electronic device 120, the third FOV 142 partially overlaps with the second FOV 146 in a second overlapping region 148 of the first physical environment 100. The amount of the partial overlap (e.g., the size of the second overlapping region 148) is less than a threshold amount.

Figure 1D:
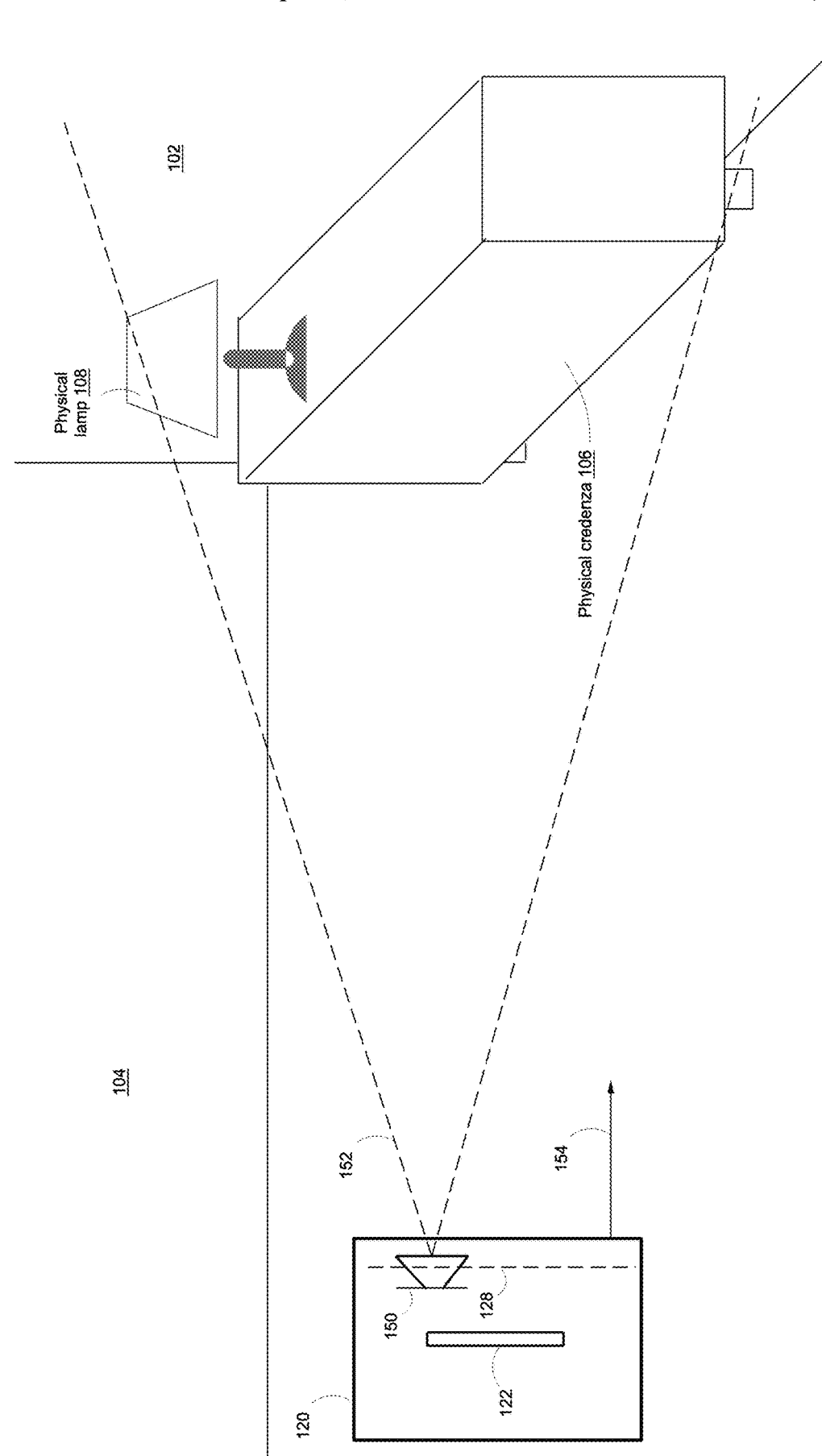
Figure 1E:
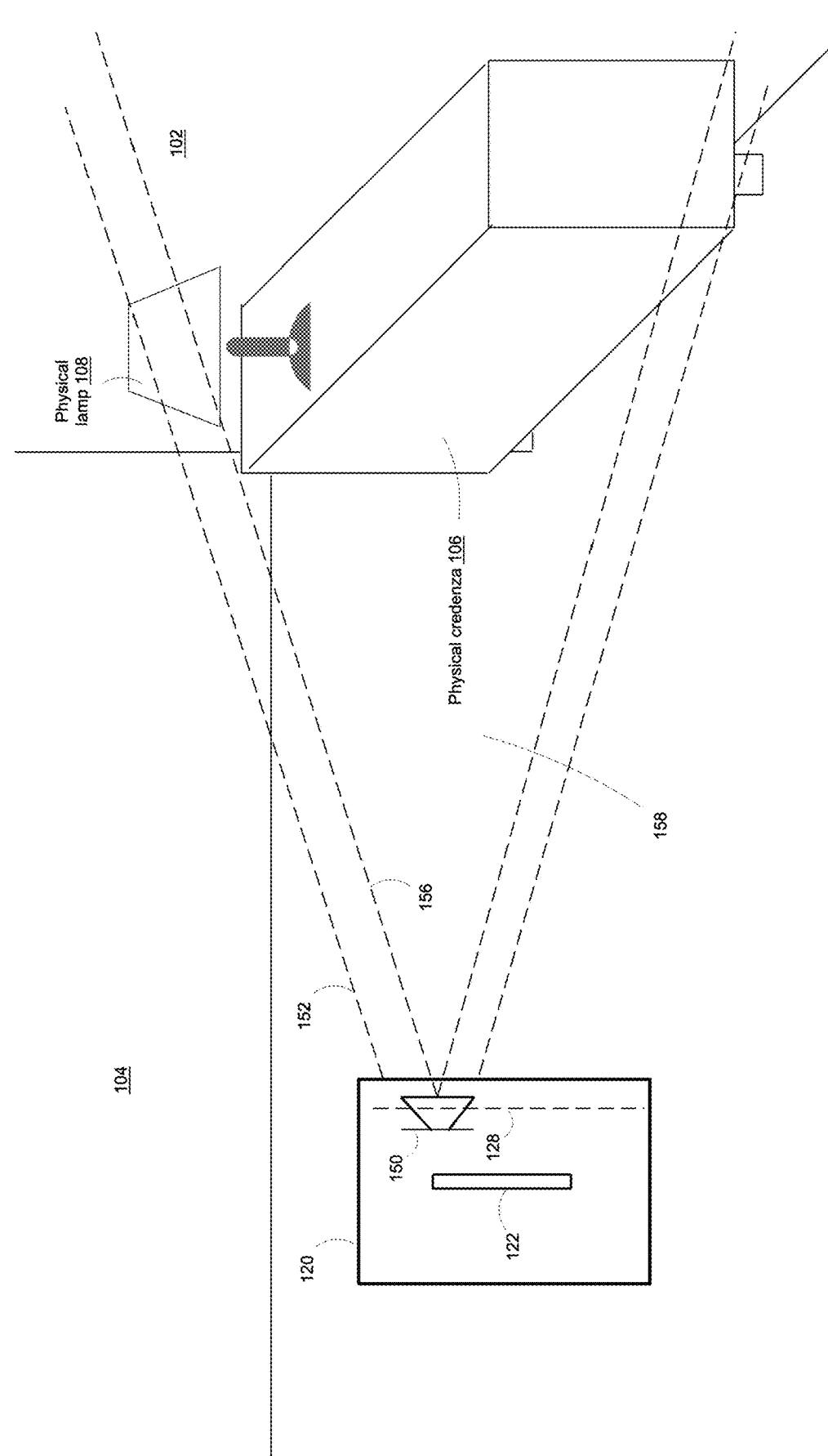

As illustrated in FIGS. 1D and 1E, in some implementations, the electronic device 120 includes a single, fifth image sensor 150 that captures image data as the electronic device 120 moves within the first physical environment 100.

As illustrated in FIG. 1D, before the motion of the electronic device 120, the fifth image sensor 150 has a fifth FOV 152, and captures image data of the first physical environment 100. The motion corresponds to a forward motion 154 within the first physical environment 100, towards the physical credenza 106.

As illustrated in FIG. 1E, after completion of the motion, the fifth image sensor 150 has a different, sixth FOV 156. As compared with the fifth FOV 152, the sixth FOV 156 includes less of the first physical environment 100 because the sixth FOV 156 corresponds to the electronic device 120 being closer to the first physical wall 102. Because the motion is a forward motion, the fifth FOV 152 has a relatively large amount of overlap with the sixth FOV 156, in a third overlapping region 158 of the first physical environment 100. Thus, the amount of the partial overlap (e.g., the size of the third overlapping region 158) is less than a threshold amount.

FIGS. 2A-2E are an example of generating a 3D reconstruction by rectifying images via an equirectangular rectification in accordance with some implementations. In some implementations, the example described with reference to FIGS. 2A-2E are implemented by the electronic device 120, or by a system 410 described with reference to FIG. 4.

Figure 2A:
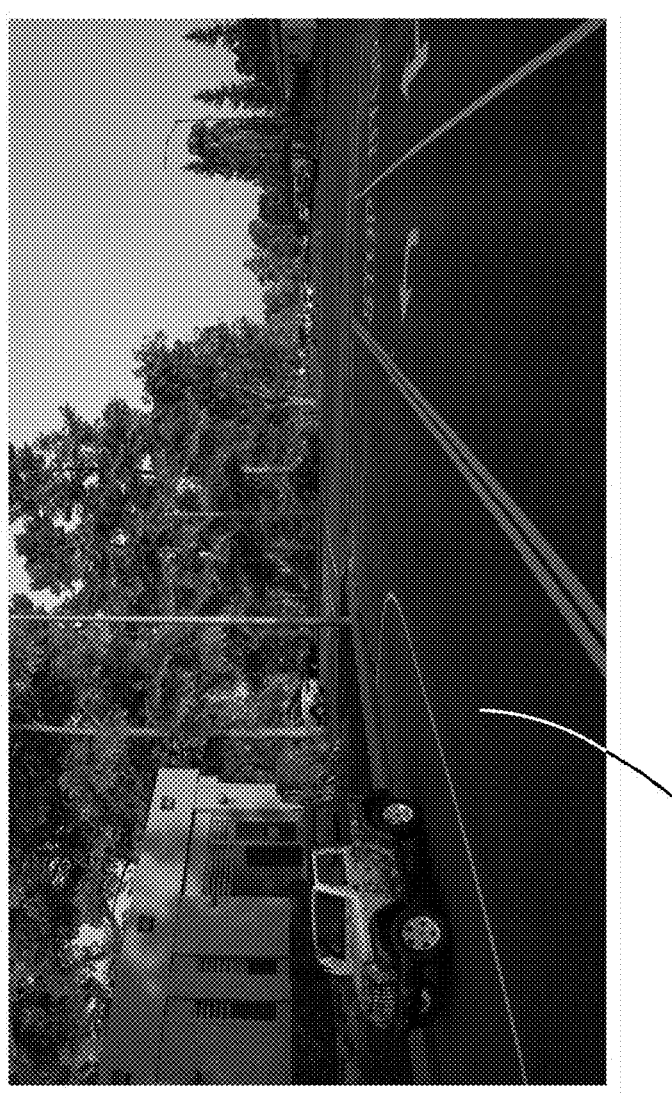
FIGS. 2A-2E are an example of generating a 3D reconstruction by rectifying images via an equirectangular rectification in accordance with some implementations.
Figure 2A:
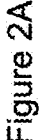
Figure 2A:
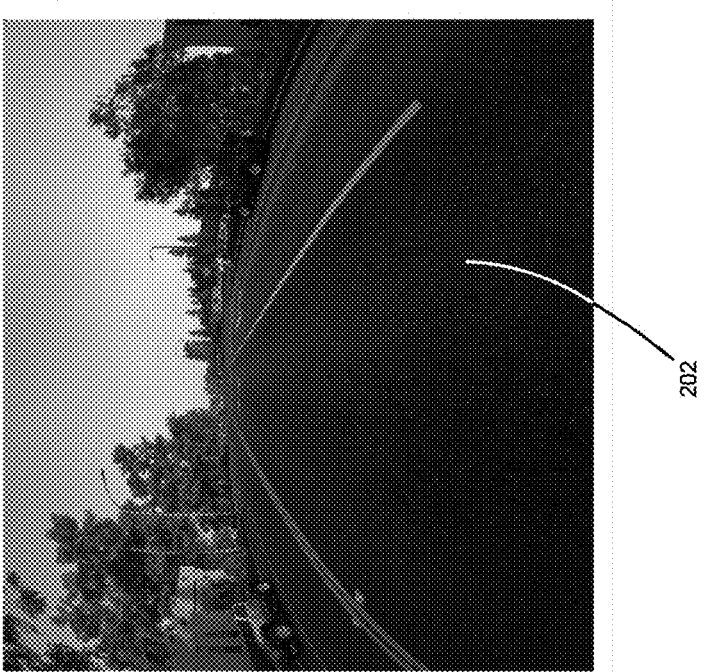

FIG. 2A illustrates a first image 202 of a second physical environment, and a second image 204 of the second physical environment. The physical environment is outdoors, including a street, parked car, building, trees, etc. In some implementations, the first image 202 is captured via a fisheye camera (e.g., in curvilinear space), whereas the second image 204 is captured via a pinhole camera (e.g., in rectilinear space).

The first image 202 is associated with a first FOV of the second physical environment, whereas the second image 204 is associated with a second FOV of the second physical environment. The first FOV is narrower than the second FOV. For example, with reference to FIG. 1B, the first image sensor 130 (with the wide lens) captures the second image 204, and the second image sensor 134 (with the standard lens) captures the first image 202. Notably, the first FOV partially overlaps with the second FOV. In some implementations, the partial overlap is less than a threshold amount. Because of the relatively small amount of overlap, rectifying the first image 202 and the second image 204 via epipolar geometry may result in a relatively low quality 3D reconstruction. For example, when performing an epipolar-based image rectification of the first image 202 and the second image 204, the rectified first and second images may have a relatively low amount of disparity with respect to each other. The relatively low amount of disparity may reduce the accuracy of depth calculations made during the 3D reconstruction. Some implementations include using a fisheye model (e.g., a fisheye equirectangular projective model) to determine the FOV intersection.

Figure 2B:
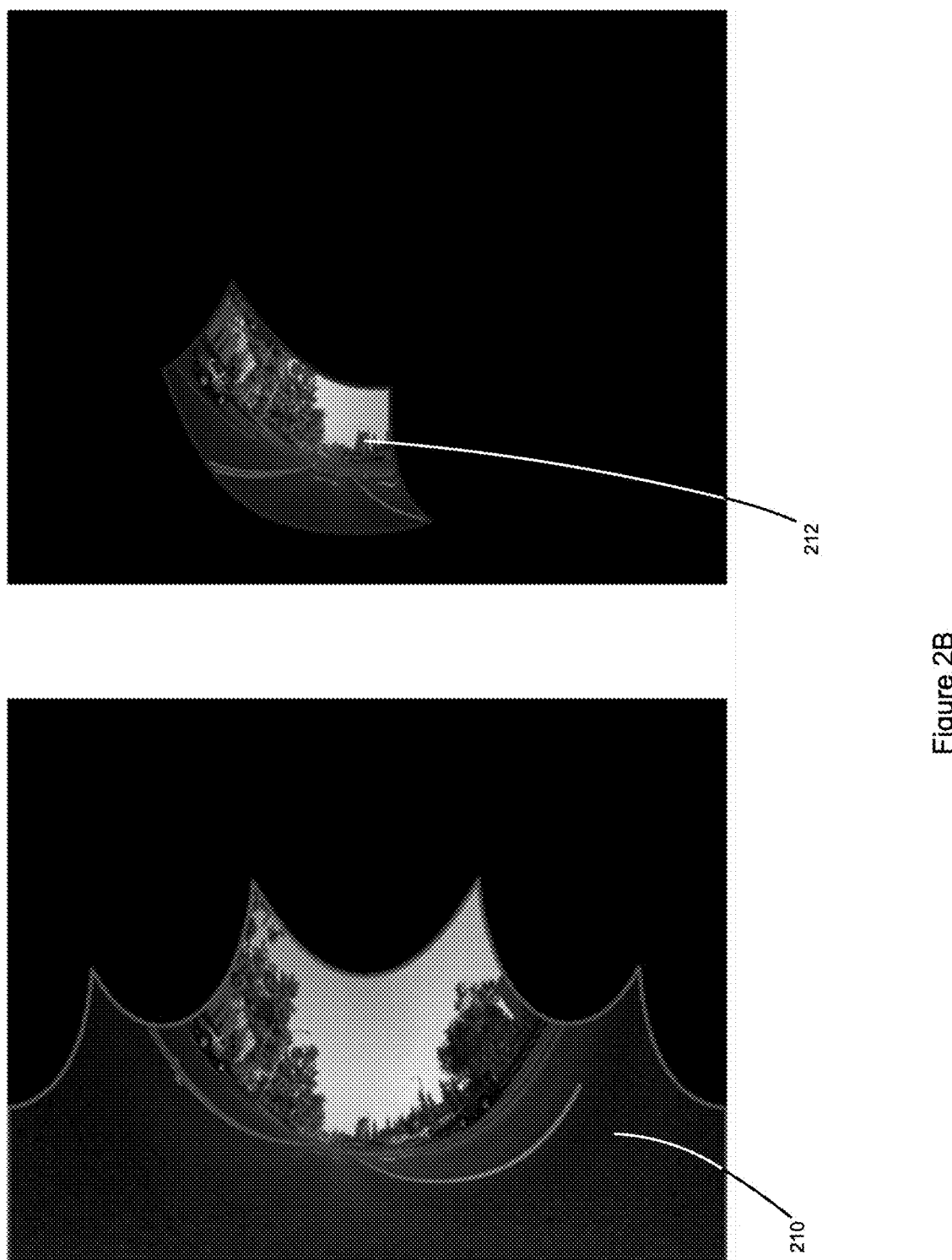

Accordingly, various implementations include rectifying images according to a equirectangular rectification (e.g., into curvilinear space). For example, the first image 202 is rectified with the second image 204 via an equirectangular rectification (e.g., using a fisheye equirectangular projective model), in order to generate a first equirectangular image 210 and a second equirectangular image 212, as illustrated in FIG. 2B. As compared with rectified images that are rectified via an epipolar based image rectification, the first equirectangular image 210 and the second equirectangular image 212 have a greater disparity level with respect to each other, enabling generation of a more accurate 3D reconstruction.

Figure 2C:
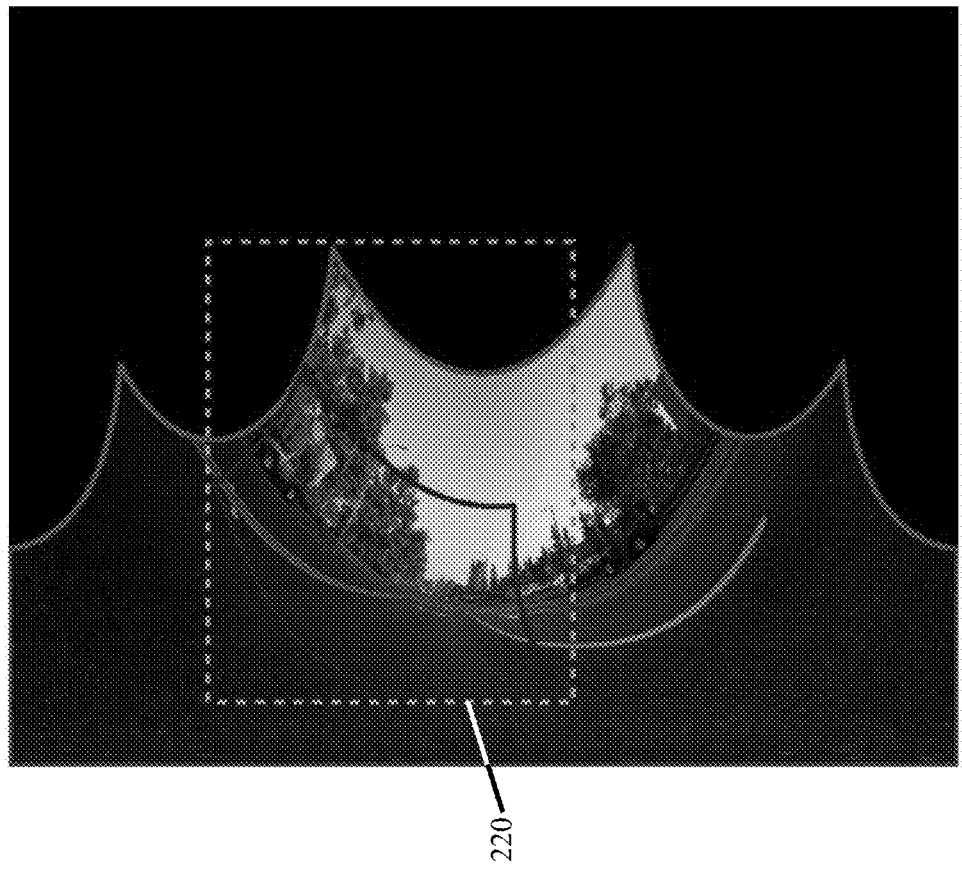

Moreover, various implementations include determining a FOV intersection region based on equirectangular images. For example, as illustrated in FIG. 2C, the electronic device determines a FOV intersection region 220 based on the first equirectangular image 210 and the second equirectangular image 212. The FOV intersection region 220 is indicated in FIG. 2C by a dotted white rectangular box. For example, in some implementations, determining the FOV intersection region 220 is based on respective borders of the first image 202 and the second image 204. In some implementations, the FOV intersection region 220 characterizes an optimal overlapping FOV region of two cameras integrated in an electronic device.

Figure 2D:
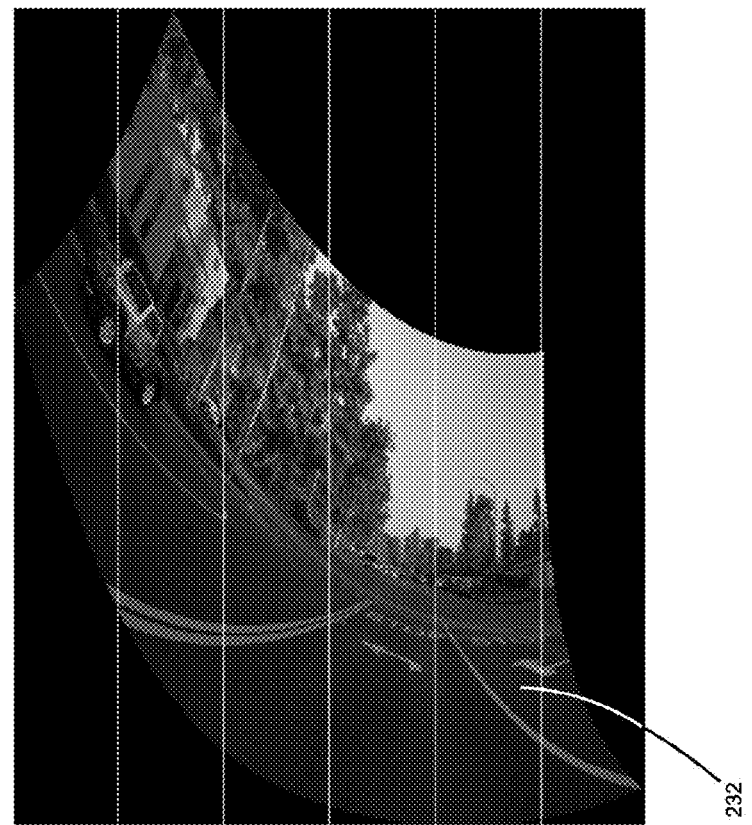
Figure 2D:
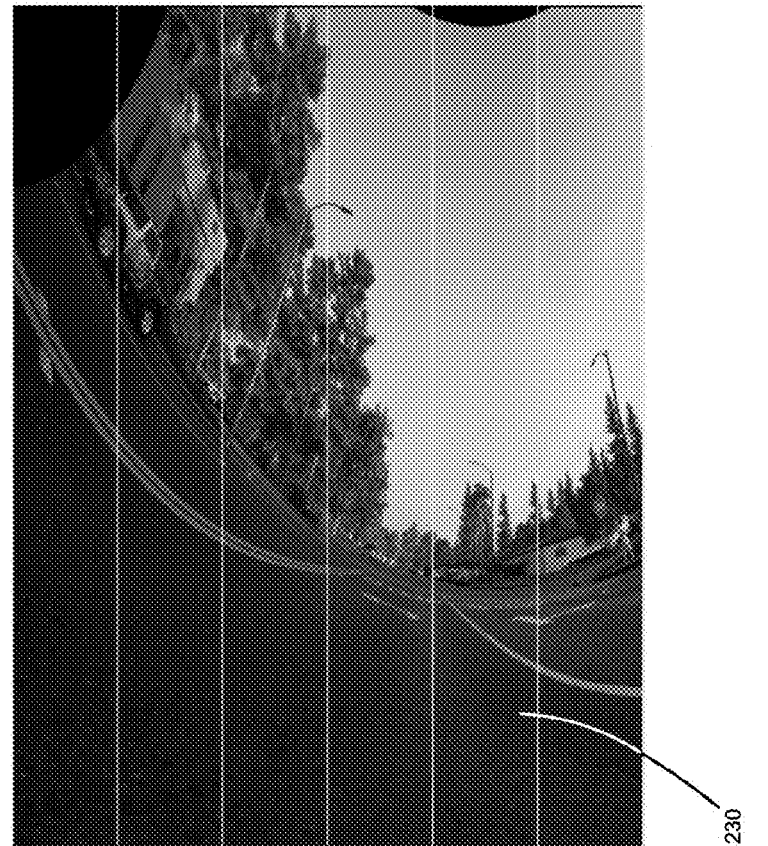
Figure 2E:
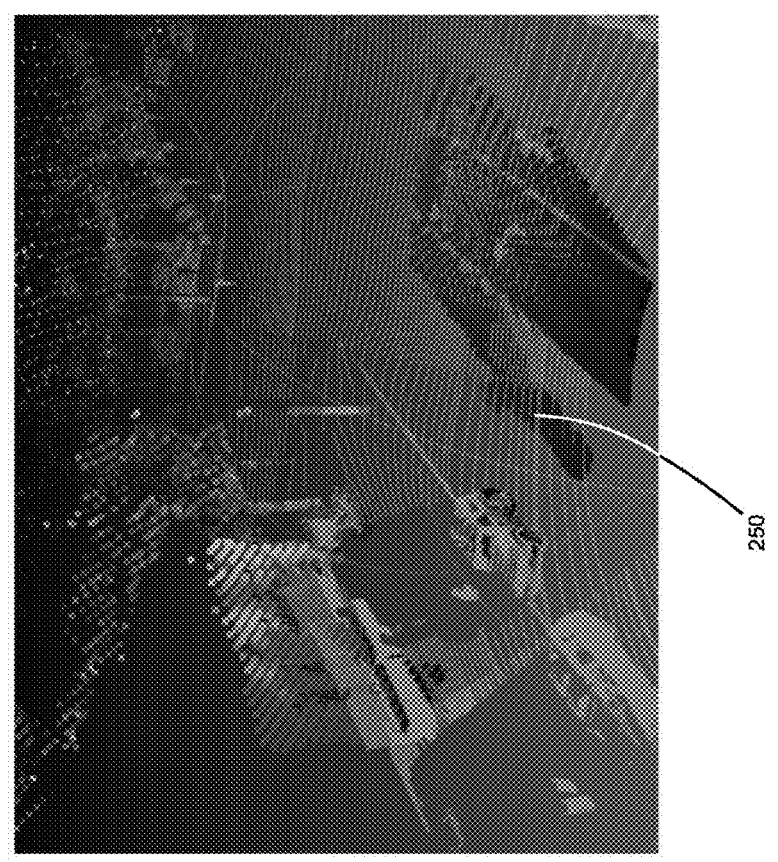
Figure 2E:
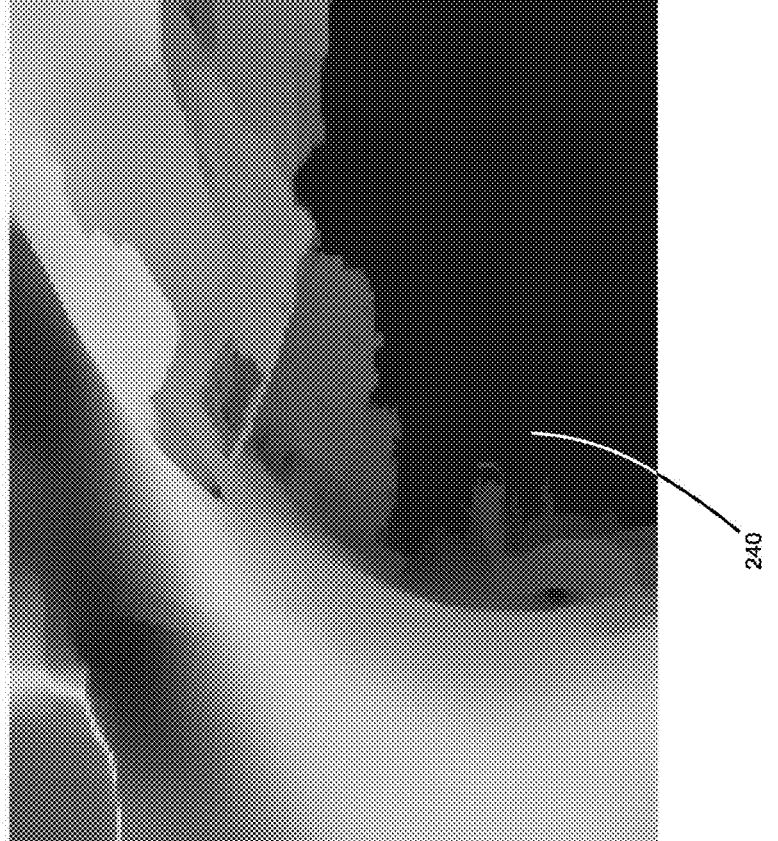

Moreover, various implementations include modifying the equirectangular images based on the FOV intersection region. For example, as illustrated in FIG. 2D, the electronic device modifies the first equirectangular image 210 based on the FOV intersection region 220, in order to generate a first modified image 230. Moreover, as further illustrated in FIG. 2D, the electronic device modifies the second equirectangular image 212 based on the FOV intersection region 220, in order to generate a second modified image 232. In some implementations, modifying an equirectangular image includes cropping out a region of the equirectangular image that is outside of the FOV intersection region. In some implementations, modifying an equirectangular image includes scaling (e.g., increasing the size of) the equirectangular image based on the FOV intersection region. Accordingly, various implementations include generating modified images by rectifying images according to a equirectangular rectification, and modifying the (rectified) equirectangular images based on a FOV intersection region.

In some implementations, the first modified image 230 and the second modified image 232 together characterize a best estimate of a rectified image pair, for a given image size. For example, an optimal rectified image pair may be application dependent—e.g., the optimal rectified image pair is constrained by a given stereo reconstruction network.

As compared with other 3D reconstruction methods that include rectifying via an epipolar rectification, the first modified image 230 and the second modified image 232 have greater disparity with respect to each other. The relatively high disparity between the first modified image 230 and the second modified image 232 is indicated via a disparity map 240, illustrated in FIG. 2E. The disparity map 240 indicates an amount of horizontal displacement between a visual feature in one image and the visual feature in another image. In some implementations, the 3D reconstruction 250 is generated based on values of the disparity map 240.

Other implementations disclosed herein includes warping images based on respective coordinate transforms into curvilinear space, without generating intermediate equirectangular images as described with reference to FIGS. 2A-2E.

Foregoing generating equirectangular images may reduce resource (e.g., processor) utilization.

Figure 3B:
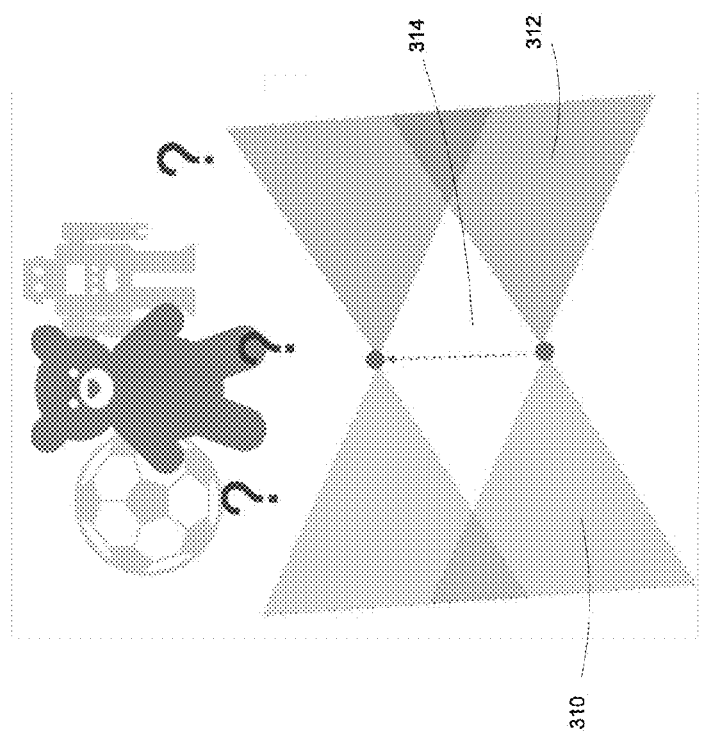
FIGS. 3A and 3B are an example of an overlapping image pair being non-rectifiable using a pinhole camera model.
Figure 3A:
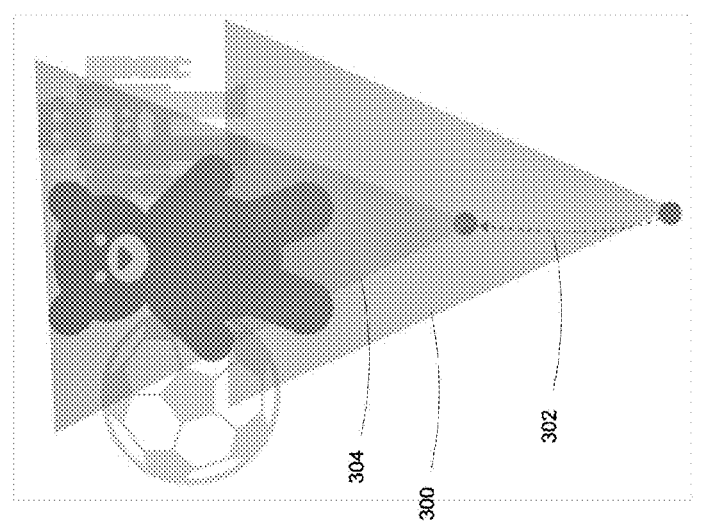

FIGS. 3A and 3B are an example of an overlapping image pair being non-rectifiable using a pinhole camera model.

As illustrated in FIG. 3A, a third physical environment includes various physical objects, including a physical soccer ball, a physical robot, and a physical teddy bear. An image sensor within the third physical environment captures a first image of the third physical environment, wherein the first image is associated with a first FOV 300. Subsequently, the image sensor moves forward towards the physical objects, as indicated by a movement line 302. After the movement completes, the image sensor has a second FOV 304, and the image sensor captures a second image of the physical environment.

As illustrated in FIG. 3B, the electronic device cannot rectify the first image (associated with the first FOV 300) with the second image (associated with the second FOV 304) using a pinhole camera model, as is indicated by the question marks. Namely, based on epipolar geometry of the pinhole camera model, the electronic device cannot perform the rectification.

Figure 3D:
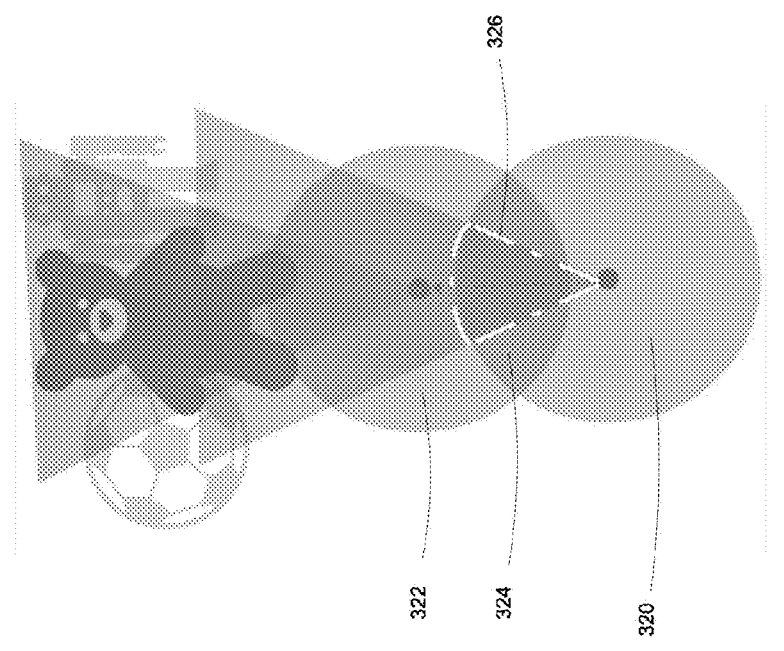
FIGS. 3C and 3D are an example of an overlapping image pair being rectifiable in accordance with some implementations.
Figure 3C:
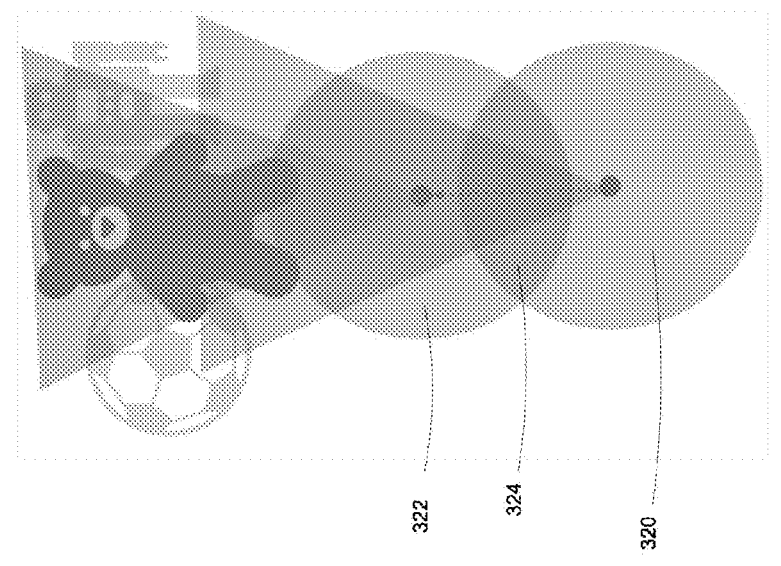

FIGS. 3C and 3D are an example of an overlapping image pair being rectifiable in accordance with some implementations. In some implementations, the example described with reference to FIGS. 3C and 3D are implemented by the electronic device 120, or by the system 410 described with reference to FIG. 4.

Rather than using the pinhole camera model described with reference to FIG. 3B, in some implementations, an electronic device transforms respective image coordinates (associated with the first FOV 300 and the second FOV 304) into curvilinear space. Moreover, in some implementations, the electronic device rectifies the first image with the second image based on the transformations, in order to generate a first equirectangular image 320 and a second equirectangular image 322, as illustrated in FIG. 3C. Based on the transform into curvilinear space, the first equirectangular image 320 and the second equirectangular image 322 overlap in an overlapping region 324, as illustrated in FIG. 3C. The overlap between the first equirectangular image 320 and the second equirectangular image 322 enables generation of a more accurate 3D reconstruction of the third physical environment, as compared with the non-overlapping example described with reference to FIG. 3B.

Moreover, in some implementations, the electronic device determines a FOV intersection region 326 within the overlapping region 324, as illustrated in FIG. 3D. The FOV intersection region 326 is indicated via a dotted white triangle. In some implementations, the electronic device transforms the first image and the second image based on the FOV intersection region 326, and uses the transformed first and second images to generate a 3D reconstruction. For example, the electronic device warps the first image and the second image via an image warping function based on the source image camera model, such as a fisheye equidistance model, a fisheye equirectangular model, or an omnidirectional model. In some implementations, the electronic device selects an image warping function that is well suited to warp the first and second images based on the FOV intersection region 326.

Figure 4:
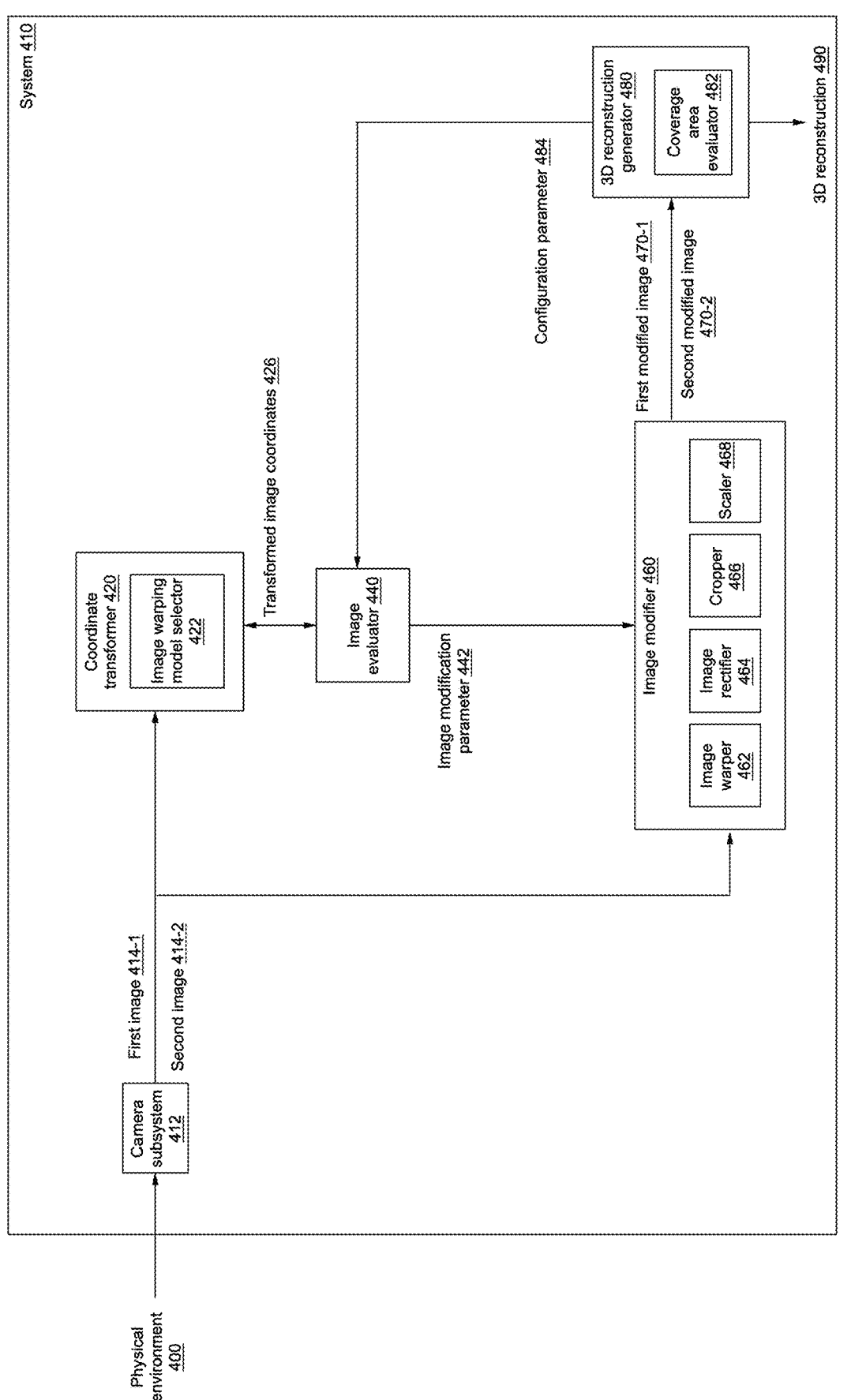
FIG. 4 is an example of a block diagram of a system for transforming image coordinates into curvilinear space, in order to generate a 3D reconstruction in accordance with some implementations.

FIG. 4 is an example of a block diagram of a system 410 for transforming image coordinates into curvilinear space, in order to generate a 3D reconstruction 490 in accordance with some implementations.

In some implementations, the system 410 includes a camera subsystem 412 for capturing one or more images of a physical environment 400. In some implementations, the camera subsystem 412 includes a first image sensor that captures a first image 414-1 of the physical environment 400, and optionally captures a second image 414-2 of the physical environment 400. For example, the first image sensor captures the first image 414-1 while having a first FOV of the physical environment 400. Continuing with this example, after motion (e.g., backwards or forwards) within the physical environment 400, the first image sensor captures the second image 414-2 while having a different, second FOV of the physical environment 400.

In some implementations, the camera subsystem 412 also includes a second image sensor that captures the second image 414-2 of the physical environment 400. For example, the first image sensor and the second image sensor are disposed on a surface of an electronic device, such as being vertically, horizontally, or diagonally aligned on the surface.

A particular image sensor of the camera subsystem 412 may include any type of lens, such as a fisheye lens or a pinhole camera model lens.

In some implementations, the system 410 includes a coordinate transformer 420. The coordinate transformer 420 transforms respective image coordinates of at least one of the first image 414-1 and the second image 414-2 into the curvilinear space. To that end, as illustrated in FIG. 4, the coordinate transformer 420 determines one or more transformed image coordinates 426.

In some implementations, the coordinate transformer 420 includes an image warping model selector 422. The image warping model selector 422 may select an appropriate image warping model to use in order to determine the transformed image coordinate(s) 426. The image warping mode may correspond to one of a fisheye equidistance model, a fisheye equirectangular model, or an omnidirectional model. For example, selection of the image warping model may be based on an extrinsic feature(s) of the camera subsystem 412, such as a rotational feature or a translational feature. As another example, selection of the image warping model may be based on an intrinsic feature(s) of the camera subsystem 412, and the intrinsic feature(s) may be used to determine a FOV intersection region. In some implementations, the default image warping model is a fisheye model, in order to produce a larger FOV (as compared with a pinhole camera model). In some implementations, the image warping model selector 422 selects a pinhole camera model because the pinhole camera model uses less computational resources than does a fisheye model.

In some implementations, the system 410 includes an image evaluator 440 that determines an image modification parameter 442. The image modification parameter 442 is used to generate a first modified image 470-1 and a second modified image 470-2, as is described below.

For example, determining the image modification parameter 442 includes determining a FOV intersection region based on the transformed image coordinate(s) 426. In some implementations, the image evaluator 440 determines the FOV intersection region by determining respective border shapes of the first image 414-1 and the second image 414-2 in the curvilinear space. For example, with reference to FIG. 2C, the image evaluator 440 determines the FOV intersection region 220. As another example, with reference to FIG. 3D, the image evaluator 440 determines the FOV intersection region 326.

As another example, determining the image modification parameter 442 is based a 3D baseline vector that characterizes the transformed image coordinate(s) 426. For example, when using a pinhole camera model, the 3D baseline is selected so as to be substantially perpendicular to an orientation of the camera subsystem 412. In some implementations, the image modification parameter 442 is selected to restrict the 3D baseline vector between a minimum size and a maximum size.

As yet another example, determining the image modification parameter 442 is based on a configuration parameter 484 associated with generation of a 3D reconstruction. For example, the configuration parameter 484 indicates a range associated with the 3D reconstruction, such as a disparity range, or a minimum or maximum range associated with a 3D point cloud. In some implementations, generation of the 3D reconstruction is via a neural network trained to accommodate a certain number of pixels (e.g., wherein the disparity range is between 0.5-150), and the configuration parameter 484 indicates a disparity range associated with the certain number of pixels.

In some implementations, the system 410 includes an image modifier 460. The image modifier 460 generates a first modified image 470-1 and a second modified image 470-2, based on the first image 414-1, the second image 414-2, and the image modification parameter 442. For example, in some implementations, generation of the first modified image 470-1 and the second modified image 470-2 is in response to determining that the FOV intersection region satisfied a threshold. For example, the FOV intersection region satisfies the threshold when the FOV intersection region is larger than a threshed size. In some implementations, the FOV intersection region satisfied the threshold when a rectangular sub-region (of the FOV intersection region) includes a substantial amount of coverage from both the first image 414-1 and the second image 414-2, and when the rectangular sub-region has a size that is sufficiently similar to a warped region of the smaller of the two FOVs.

In some implementations, the image modifier 460 includes an image warper 462. The image warper 462 warps the first image 414-1 based on the FOV intersection region, to generate a first warped image. Moreover, the image warper 462 warps the second image 414-2 based on the FOV intersection region, to generate a second warped image. For example, warping an image is via the image warping model selected by the image warping model selector 422, wherein the selection is based on the FOV intersection region.

In some implementations, the image modifier 460 includes an image rectifier 464. The image rectifier 464 rectifies the first image 414-1 and the second image 414-2 with each other into the curvilinear space, based on the transformed image coordinate(s) 426, in order to generate a first intermediate equirectangular image and a second intermediate equirectangular image. For example, with reference to FIG. 2B, the first intermediate equirectangular image corresponds to the first equirectangular image 210, and the second intermediate equirectangular image corresponds to the second equirectangular image 212.

In some implementations, the image modifier 460 includes a cropper 466. The cropper 466 may crop out a non-relevant portion of a warped image (from the image warper 462) or of an intermediate equirectangular image (from the image rectifier 464). For example, the cropper 466 crops out respective regions that are outside of the FOV intersection region. As one example, with reference to FIGS. 2B and 2C, the cropper 466 crops out respective regions of the first equirectangular image 210 and the second equirectangular image 212 that are outside of the FOV intersection region 220.

In some implementations, the image modifier 460 includes a scaler 468. The scaler 468 may scale up a cropped image. For example, with reference to FIGS. 2C and 2D, after performing the respective cropping operations on the first equirectangular image 210 and the second equirectangular image 212, the scaler 468 scales up each of the cropped images, in order to generate the first modified image 230 and the second modified image 232.

In some implementations, the image modifier 460 foregoes generating an intermediate equirectangular image, and instead modifies, via the cropper 466 and/or the scaler 468, a warped image in order to generate a corresponding modified image. Foregoing generating an intermediate equirectangular image reduces resource utilization by the system 410.

In some implementations, the image modifier 460 generates, via the image rectifier 464, an intermediate equirectangular image, and modifies, via the cropper 466 and/or the scaler 468, the intermediate equirectangular image in order to generate a corresponding modified image.

In some implementations, the image modifier 460 performs a direct warp of the first image 414-1 and the second image 414-2, such as via a reverse lookup table. In some implementations, the image modifier 460 utilizes UV mapping, in conjunction with a rendering engine (e.g., a graphics processing unit (GPU)).

In some implementations, the system 410 includes a 3D reconstruction generator 480. The 3D reconstruction generator 480 generates a 3D reconstruction 490 of the physical environment 400 based at least in part on the first modified image 470-1 and the second modified image 470-2. In some implementations, the 3D reconstruction generator 480 includes a coverage area evaluator 482. The coverage area evaluator 482 determines whether or not the FOV intersection region satisfies a coverage condition. For example, the coverage area evaluator 482 determines that the FOV intersection region satisfies the coverage condition by determining that the FOV intersection region exceeds a size threshold, e.g., the FOV intersection region has an area above an area threshold. In some implementations, generating the 3D reconstruction 490 is in response to determining that the FOV intersection region satisfies the coverage condition. As described above, in some implementations, the 3D reconstruction generator 480 provides a configuration parameter 484 to the image evaluator 440. The configuration parameter 484 characterizes the 3D reconstruction performed by the 3D reconstruction generator 480.

Figure 5:
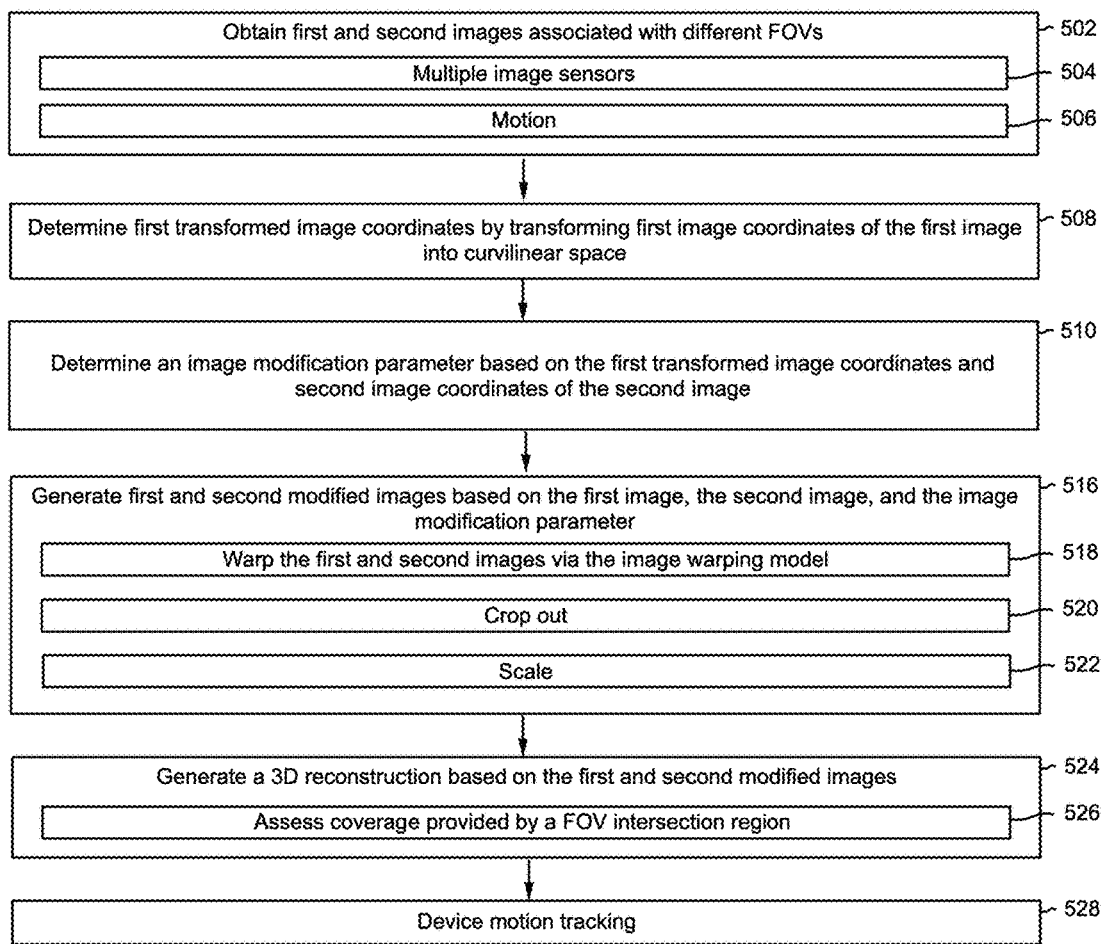
FIG. 5 is an example of a flow diagram of a method of transforming image coordinates into curvilinear space in accordance with some implementations.

FIG. 5 is an example of a flow diagram of a method 500 of transforming image coordinates into curvilinear space in accordance with some implementations. In various implementations, the method 500 or portions thereof are performed by an electronic device, such as the electronic device 120 illustrated in FIGS. 1A-1E. In various implementations, the method 500 or portions thereof are performed by the system 410 of FIG. 4. In some implementations, the method 500 is performed by processing logic, including hardware, firmware, software, or a combination thereof. In some implementations, the method 500 is performed by a processor executing code stored in a non-transitory computer-readable medium (e.g., a memory). In various implementations, some operations in method 500 are, optionally, combined and/or the order of some operations is, optionally, changed.

As represented by block 502, In some implementations, the method 500 includes obtaining first and second images of a physical environment. The first image is characterized by first image coordinates, and the second image is characterized by second image coordinates. The first image is associated with first FOV that is different from a second FOV associated with the second image. Moreover, the first FOV partially overlaps with the second FOV. In some implementations, the first image corresponds to a first rectilinear image, and the second image corresponds to a second rectilinear image. For example, a particular rectilinear image is associated with a FOV that is substantially less than 180 degrees. In some implementations, an electronic device performing the method 500 captures the first and second images via an image sensor that includes a rectilinear lens (e.g., modeled by a pinhole camera model), resulting in capture of the first and second rectilinear images. In some implementations, one or both of the first and second images corresponds to a respective curvilinear image, such as an image captured by a curvilinear (e.g., fisheye) lens.

In some implementations, the partial overlap between the first FOV and the second FOV comprises less than a threshold portion of the first FOV, and the partial overlap comprises less than a threshold portion of the second FOV. For example, in some implementations, a limit of amount of overlap exists between the first FOV and the second FOV. The limited overlap may result from the fact that the first and second image sensors are disposed on the same electronic device, which itself is of a limited size. Moreover, in some implementations, the limited overlap may be because the first and second image sensors are substantially aligned with each other on a surface of the electronic device. Accordingly, a relatively small baseline may exist between the first and second images, resulting in a low level of image disparity, and ultimately resulting in a low quality 3D reconstruction when conventional rectification methods (e.g., based on epipolar geometry) are used. Accordingly, as described below, the method 500 includes transforming image coordinates into curvilinear space, in order to produce higher FOVs and ultimately a higher quality 3D reconstruction.

As represented by block 504, in some implementations, obtaining the first and second images is via multiple image sensors. For example, with reference to FIG. 1B, the first image is captured by the first image sensor 130, and the second image is captured by the second image sensor 134. As another example, with reference to FIG. 1C, the first image is captured by the third image sensor 140, and the second image is captured by the fourth image sensor 144. The multiple image sensors may have a variety of capture modalities, such as the same lens type, different lens type, same width of FOVs, different width of FOVs, etc.

As represented by block 506, in some implementations, obtaining the first and second images includes motion of an electronic device performing the method 500, such as a forwards or a backwards motion. For example, with reference to FIGS. 1D and 1E, the electronic device 120 includes a fifth image sensor 150. While in a first position (before motion), the fifth image sensor 150 captures the first image, as illustrated in FIG. 1D. After the forwards motion, the fifth image sensor 150 captures the second image, as illustrated in FIG. 1E. Notably, because of the nature of forwards or backwards motion, the first FOV (associated with the first image) and the second FOV (associated with the second image) are similar to each other, resulting in low image disparity and ultimately a low quality 3D construction via other methods.

As represented by block 508, the method 500 includes determining first transformed image coordinates by transforming first image coordinates of the first image into curvilinear space. For example, determining the first transformed image coordinates includes computing respective border shapes of the first and second images into the curvilinear space. As another example, with reference to FIG. 4, the coordinate transformer 420 determines first and second transformed image coordinate(s) 426 by transforming respective image coordinates of the first image 414-1 and the second image 414-2. In some implementations, the method 500 includes generating first and second intermediate equirectangular images, respectively associated with the first and second images. To that end, in some implementations, the method 500 includes generating the first intermediate equirectangular image by warping the first image based on the first coordinate transform. For example, with reference to FIGS. 2A and 2B, an electronic device generates the first equirectangular image 210 by warping the first image 202 based on the first coordinate transform. Further to that end, in some implementations, the method 500 includes generating the second intermediate equirectangular image by warping the second image based on the second coordinate transform. For example, with reference to FIGS. 2A and 2B, the electronic device generates the second equirectangular image 212 by warping the second image 204 based on the second coordinate transform. As another example, with reference to FIG. 4, the image rectifier 464 rectifies the first image 414-1 with the second image 414-2, in order to generate the first and second intermediate equirectangular images.

As represented by block 510, the method 500 includes determining an image modification parameter based on the first transformed image coordinates and the second image coordinates of the second image. For example, determining the image modification parameter includes determining a FOV intersection region based on the first transformed image coordinates and the second image coordinates. In some implementations, the method 500 includes determining the FOV intersection region satisfied a threshold, and proceeding to generate first and second modified images (block 516) in response to satisfaction of the threshold. Determining the image modification parameter may be further based on a 3D baseline vector or on a configuration parameter associated with 3D reconstruction.

As represented by block 516, the method 500 includes generating first and second modified images based on the first image, the second image, and the image modification parameter. For example, with reference to FIG. 4, the image modifier 460 generates the first modified image 470-1 and the second modified image 470-2, based on the first image 414-1, the second image 414-2, and the image modification parameter 442. To that end, as represented by block 518, in some implementations, generating the first modified image includes warping the first image via the image warping model to generate a first warped image. Further to that end, as represented by block 518, generating the second modified image includes warping the second image via the image warping model to generate a second warped image. For example, with reference to FIG. 4, the image warper 462 warps the first image 414-1 and the second image 414-2 based on a selected image warping model.

In various implementations, generating the first and second modified images includes modifying the first and second warped images based on the FOV intersection region.

For example, as represented by block 520, modifying the first and second warped images includes cropping out (e.g., via the cropper 466 of FIG. 4) respective regions of the first and second warped images, based on the FOV intersection region. A cropped out region may be a region that is outside of the FOV intersection region. In other words, the cropped out region may not overlap with the FOV intersection region. For example, in some implementations, the method 500 includes cropping out respective regions of the first and second intermediate equirectangular images, such as described with reference to FIGS. 2C and 2D. As another example, in some implementations, the method 500 includes cropping out respective regions of the first and second warped images.

As another example, as represented by block 522, modifying the first and second warped images includes scaling (e.g., via the scaler 468 of FIG. 4) the first and second warped images, based on the FOV intersection region. For example, a portion of the first equirectangular image 210 that is within the FOV intersection region 220 (as illustrated in FIG. 2C) is scaled up, resulting in the first modified image 230 in FIG. 2D. Continuing with this example, a portion of the second equirectangular image 212 that is within the FOV intersection region 220 (as illustrated in FIG. 2C) is scaled up, resulting in the second modified image 232 in FIG. 2D.

As represented by block 524, in some implementations, the method 500 includes generating a 3D reconstruction of the physical environment based at least in part on the first and second modified images. As one example, with reference to FIG. 4, the 3D reconstruction generator 480 generates the 3D reconstruction 490, based on the first modified image 470-1 and the second modified image 470-2. As another example, an electronic device generates the 3D reconstruction 250 illustrated in FIG. 2E, based on the first modified image 230 and the second modified image 232 illustrated in FIG. 2D. In some implementations, generating the 3D reconstruction includes, for a particular pixel of the 3D reconstruction, determining a disparity between a respective location of the particular pixel in the first modified image and a respective location of the particular pixel in the second modified image.

In some implementations, generating the 3D reconstruction is based at least in part on the first and second intermediate equirectangular images. On the other hand, in some implementations, the method 500 includes foregoing generation of the first or second intermediate equirectangular images, and the method 500 includes generating the 3D reconstruction based at least in part on the first and second modified images. Foregoing generating the first or second intermediate equirectangular images reduces resource utilization of an electronic device performing the method 500.

As represented by block 526, in some implementations, generating the 3D reconstruction includes determining that the FOV intersection region satisfies a coverage condition, such as via the coverage area evaluator 482 of FIG. 4. For example, determining that the coverage condition is satisfied includes determining that the FOV intersection region exceeds a threshold, such as when an area of the FOV intersection region is larger than an area threshold. In some implementations, generating the 3D reconstruction is in response to determining that the FOV intersection region satisfies the coverage condition.

As represented by block 528, in some implementations, instead of or in addition to generating the 3D reconstruction, the method 500 includes tracking a motion of an electronic device performing the method 500. For example, the method 500 includes assessing the coordinate transforms in order to track the motion of the electronic device within a physical environment. In some implementations, the method 500 includes providing the first and second coordinate transforms (determined in block 508) to a tracking subsystem, which tracks a movement of the electronic device. The tracking subsystem may perform simultaneous localization and mapping (SLAM) and/or visual inertial odometry (VIO) in order to track a position of the electronic device.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional subcomponents to be performed separately. In some instances, the order of the steps and/or phases can be rearranged and certain steps and/or phases may be omitted entirely. Also, the methods described herein are to be understood to be openended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:

at an electronic device with one or more processors and a non-transitory memory:

determining first transformed image coordinates by transforming first image coordinates of a first image into curvilinear space, wherein the first image is associated with a first field-of-view (FOV) of a physical environment;

obtaining second image coordinates of a second image associated with a second FOV of the physical environment, wherein the second FOV is different from and partially overlaps with the first FOV;

determining an image modification parameter based on the first transformed image coordinates and the second image coordinates; and generating first and second modified images based on the first image, the second image, and the image modification parameter.

2. The method of claim 1, wherein the first image coordinates exist in rectilinear space, and wherein the first transformed image coordinates exist in the curvilinear space.

3. The method of claim 2, wherein the second image coordinates exist in the curvilinear space.

4. The method of claim 3, wherein the electronic device includes a camera system that includes an image sensor including a curvilinear lens, and wherein the second image is captured via the image sensor while the image sensor has the second FOV.

5. The method of claim 2, wherein the second image coordinates exist in the rectilinear space, the method further comprising determining second transformed image coordinates by transforming the second image coordinates from the rectilinear space to the curvilinear space.

6. The method of claim 1, wherein determining the first transformed image coordinates is via an image warping model, the method further comprising:

determining a FOV intersection region based on the first transformed image coordinates and the second image coordinates; and selecting the image warping model based on the FOV intersection region.

7. The method of claim 6, further comprising:

warping the first image via the image warping model to generate a first warped image; and warping the second image via the image warping model to generate a second warped image;

wherein generating the first and second modified images is based on the first and second warped images.

8. The method of claim 7, wherein generating the first and second modified images includes:

cropping out a region of the first warped image based on the FOV intersection region; and cropping out a region of the second warped image based on the FOV intersection region.

9. The method of claim 8, wherein the region of the first warped image is outside of the FOV intersection region, and wherein the region of the second warped image is outside of the FOV intersection region.

10. The method of claim 6, wherein the image warping model corresponds to one of a fisheye equidistance model, a fisheye equirectangular model, or an omnidirectional model.

11. The method of claim 6, wherein determining the FOV intersection region is further based on respective borders of the first and second images.

12. The method of claim 1, wherein determining the image modification parameter includes:

determining a FOV intersection region based on the first transformed image coordinates and the second image coordinates; and determining whether the FOV intersection region satisfies a threshold.

13. The method of claim 12, wherein generating the first and second modified images is in response to determining that the FOV intersection region satisfies the threshold.

14. The method of claim 1, wherein determining the image modification parameter is based on a first three-dimensional (3D) baseline vector that characterizes the first transformed image coordinates, and a second 3D baseline vector that characterizes the second image coordinates.

15. The method of claim 1, wherein determining the image modification parameter is based on a configuration parameter associated with generation of a 3D reconstruction, and wherein generation of the 3D reconstruction is based at least in part on the first and second modified images.

16. The method of claim 15, wherein the configuration parameter indicates a disparity range.

17. The method of claim 15, wherein generation of the 3D reconstruction is in response to determining that a FOV intersection region satisfies a coverage condition, and wherein the FOV intersection region is based on the first transformed image coordinates and the second image coordinates.

18. The method of claim 1, wherein the partial overlap between the first FOV and the second FOV is less than a threshold amount.

19. An electronic device comprising:

one or more processors;

a non-transitory memory; and one or more programs, wherein the one or more programs are stored in the non-transitory memory and configured to be executed by the one or more processors, the one or more programs including instructions for:

determining first transformed image coordinates by transforming first image coordinates of a first image into curvilinear space, wherein the first image is associated with a first FOV of a physical environment;

obtaining second image coordinates of a second image associated with a second FOV of the physical environment, wherein the second FOV is different from and partially overlaps with the first FOV;

determining an image modification parameter based on the first transformed image coordinates and the second image coordinates; and generating first and second modified images based on the first image, the second image, and the image modification parameter.

20. A non-transitory computer readable storage medium storing one or more programs, the one or more programs comprising instructions, which, when executed by an electronic device with one or more processors, cause the electronic device to:

determine first transformed image coordinates by transforming first image coordinates of a first image into curvilinear space, wherein the first image is associated with a first FOV of a physical environment;

obtain second image coordinates of a second image associated with a second FOV of the physical environment, wherein the second FOV is different from and partially overlaps with the first FOV;

determine an image modification parameter based on the first transformed image coordinates and the second image coordinates; and generate first and second modified images based on the first image, the second image, and the image modification parameter.

* * * * *